US008374137B2

(12) United States Patent
Hui

(10) Patent No.: US 8,374,137 B2
(45) Date of Patent: Feb. 12, 2013

(54) SYSTEM AND METHOD OF RESOURCE ALLOCATION AND SCHEDULING AMONG BASE STATIONS

(75) Inventor: Yan Hui, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 378 days.

(21) Appl. No.: 12/607,859

(22) Filed: Oct. 28, 2009

(65) Prior Publication Data

US 2010/0111021 A1 May 6, 2010

Related U.S. Application Data

(60) Provisional application No. 61/109,407, filed on Oct. 29, 2008.

(51) Int. Cl.
*H04Q 7/00* (2006.01)

(52) U.S. Cl. ......... 370/329; 370/338; 370/468; 455/450

(58) Field of Classification Search .......... 370/229–235, 370/252–253, 328–338, 468; 455/445–453
See application file for complete search history.

(56) References Cited

U.S. PATENT DOCUMENTS

2010/0222066 A1* 9/2010 Du et al. ...................... 455/450

* cited by examiner

*Primary Examiner* — Pao Sinkantarakorn
(74) *Attorney, Agent, or Firm* — Van Pelt, Yi & James LLP

(57) ABSTRACT

This invention pertains to wireless communications, specifically, methodology and algorithm to management resources and schedule users in a coordinated way among a group of base stations, such as Femtocells, Picocells, self-organized Basestations, Access Points (APs) or mesh network nodes, or among the basestations in a two tiered networks, to improve the performance for individual user, individual Basestation (BTS), the overall systems or all of above.

16 Claims, 6 Drawing Sheets

1. Calculate $c_{ij}(k,n) = \ln(1+gp_j[k,n]q_{ij}[k,n])$ for each user {i,j} in each of N cells, for all subcarrier and for all time slots within the time average window length of $N_T$ 2. Calculate $r_{ij}[K_i,n] = \sum_{k\in K_i} c_{ij}(k,n)\Delta f$ for each user {i,j} in each of N cells, for all subcarrier group K and for all time slots within the time average window length of $N_T$ 3. Calculate $\bar{r}_{ij}[K_i,n]=(1-w)\bar{r}_{ij}[K_i,n-1] + wr_{ij}[K_i,n]$ for each user {i,j} in each of N cells, for all subcarrier group K and for all time slots within the time average window length of $N_T$ 4. While $(\bar{r}_{ij}[K_i,n]_{current} - \bar{r}_{ij}[K_i,n]_{min\_threshold})>0$
   a. Obtain the subcarrier and time slots group assignment, i.e. find $\{\hat{i},\hat{j}\}_{[\hat{K}_i,n]} = \underset{(i,j)}{\operatorname{argmax}} \{wU_{ij}'(\bar{r}_{ij}[K_i,n])c_{ij}[k,n]\}$ for all subcarrier frequency and for all time slots within the time average window length of $N_T$
   b. $\bar{r}_{ij}[K_i,n]_{current} = \bar{r}_{\hat{i}\hat{j}}[\hat{K}_i,n]$
   c. if data queue for user $\{\hat{i},\hat{j}\}$ has sufficient date
      i. Update the average throughput for user $\{\hat{i},\hat{j}\}$
      $\bar{r}_{ij}[K_i,n] = (1-w)\bar{r}_{\hat{i}\hat{j}}[\hat{K}_i,n-1] + wr_{\hat{i}\hat{j}}[\hat{K}_i,n]$
      ii. Update the data queue length and status
   d. else set $\bar{r}_{\hat{i}\hat{j}}[\hat{K}_i,n] = 0$ 5. end 1. Calculate $c_{ij}(k,n) = \ln(1+gp_j[k,n]q_{ij}[k,n])$ for each user {i,j} in each of N cells, for all subcarrier and for all time slots within the time average window length of $N_T$ 2. Calculate $r_{ij}[K_i,n] = \sum_{k \in K_i} c_{ij}(k,n)\Delta f$ for each user {i,j} in each of N cells, for all subcarrier group K and for all time slots within the time average window length of $N_T$ 3. Calculate $\bar{r}_{ij}[K_i,n]=(1-w)\bar{r}_{ij}[K_i,n-1] + wr_{ij}[K_i,n]$ for each user {i,j} in each of N cells, for all subcarrier group K and for all time slots within the time average window length of $N_T$ 4. While $(\bar{r}_{ij}[K_i,n]_{current} - \bar{r}_{ij}[K_i,n]_{min\_threshold})>0$ a. Obtain the subcarrier and time slots group assignment, i.e. find $\{\hat{i},\hat{j}\}_{[\hat{K}_i,n]} = \underset{(i,j)}{\operatorname{argmax}} \{wU_{ij}'(\bar{r}_{ij}[K_i,n])c_{ij}[k,n]\}$ for all subcarrier frequency and for all time slots within the time average window length of $N_T$ b. $\bar{r}_{ij}[K_i,n]_{current} = \bar{r}_{\hat{i}\hat{j}}[\hat{K}_i,n]$ c. if data queue for user $\{\hat{i},\hat{j}\}$ has sufficient date i. Update the average throughput for user $\{\hat{i},\hat{j}\}$ $\bar{r}_{ij}[K_i,n] = (1-w)\bar{r}_{\hat{i}\hat{j}}[\hat{K}_i,n-1] + wr_{\hat{i}\hat{j}}[\hat{K}_i,n]$ ii. Update the data queue length and status d. else set $\bar{r}_{\hat{i}\hat{j}}[\hat{K}_i,n] = 0$ 5. end

FIG. 5

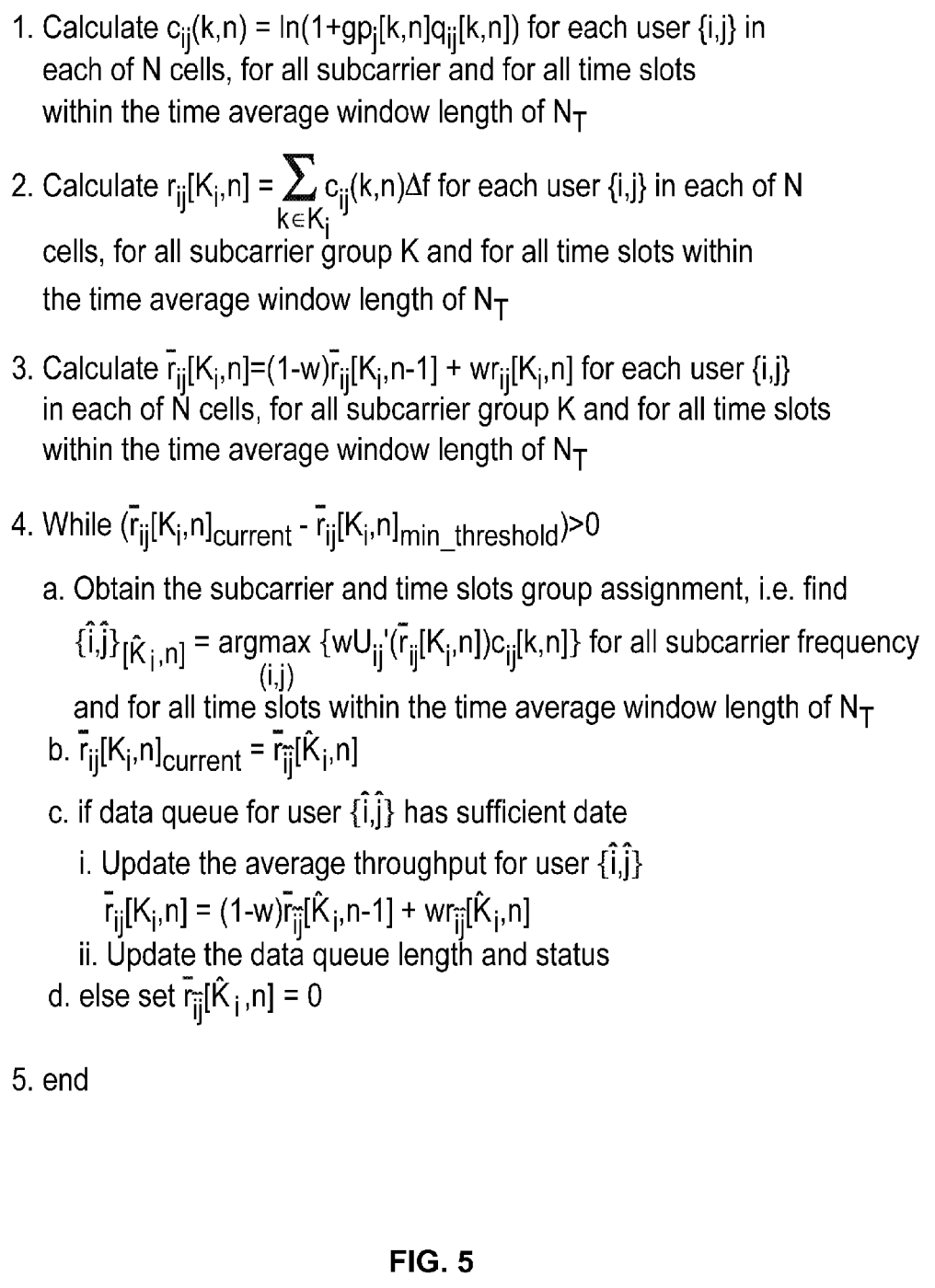

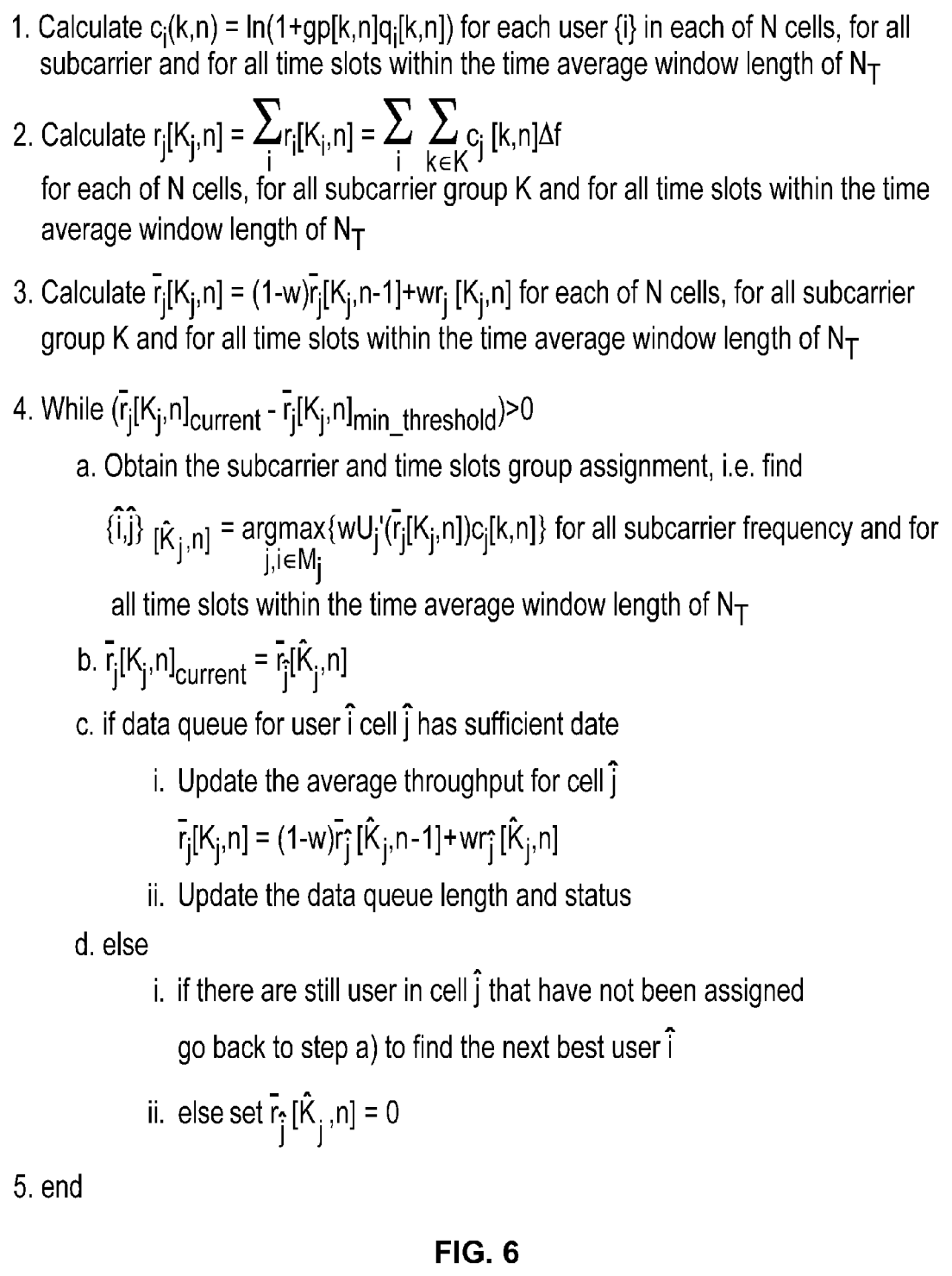

1. Calculate $c_i(k,n) = \ln(1+gp[k,n]q_i[k,n])$ for each user {i} in each of N cells, for all subcarrier and for all time slots within the time average window length of $N_T$ 2. Calculate $r_j[K_j,n] = \sum_i r_i[K_i,n] = \sum_i \sum_{k \in K} c_j[k,n]\Delta f$ for each of N cells, for all subcarrier group K and for all time slots within the time average window length of $N_T$ 3. Calculate $\bar{r}_j[K_j,n] = (1-w)\bar{r}_j[K_j,n-1]+wr_j[K_j,n]$ for each of N cells, for all subcarrier group K and for all time slots within the time average window length of $N_T$ 4. While $(\bar{r}_j[K_j,n]_{current} - \bar{r}_j[K_j,n]_{min\_threshold})>0$ a. Obtain the subcarrier and time slots group assignment, i.e. find $\{\hat{i},\hat{j}\}_{[\hat{K}_j,n]} = \underset{j,i \in M_j}{\mathrm{argmax}}\{wU_j'(\bar{r}_j[K_j,n])c_j[k,n]\}$ for all subcarrier frequency and for all time slots within the time average window length of $N_T$ b. $\bar{r}_j[K_j,n]_{current} = \bar{r}_{\hat{j}}[\hat{K}_j,n]$ c. if data queue for user $\hat{i}$ cell $\hat{j}$ has sufficient date i. Update the average throughput for cell $\hat{j}$ $\bar{r}_j[K_j,n] = (1-w)\bar{r}_{\hat{j}}[\hat{K}_j,n-1]+wr_{\hat{j}}[\hat{K}_j,n]$ ii. Update the data queue length and status d. else i. if there are still user in cell $\hat{j}$ that have not been assigned go back to step a) to find the next best user $\hat{i}$ ii. else set $\bar{r}_{\hat{j}}[\hat{K}_j,n] = 0$ 5. end

FIG. 6

SYSTEM AND METHOD OF RESOURCE ALLOCATION AND SCHEDULING AMONG BASE STATIONS

The present application claims the benefit of priority from previously filed U.S. Provisional Patent Application 61/109,407, the entire disclosure of which is hereby incorporated by reference in its entirety as if fully set forth.

FIELD OF THE INVENTION

The present disclosure pertains to wireless communications, specifically, methodology and algorithm to management resources and schedule users.

BACKGROUND OF INVENTION AND RELATED ART

There has been a great deal of work on scheduler and resource management. The general approach is to maximize a cost function subject to the capacity limit and other constraints such that certain performance measures are achieved. A great deal of work has been done in the areas of funding effective cost functions, theoretical proves of the property of those functions, solving optimization problems with those cost functions with respect to different physical layer characteristics, and the correspondent algorithms based those theoretical results. For example, a widely used cost function is a utility based function. The main advantage of a utility based resource management compared to more traditional system centric criteria, such as power, outage probability and throughput, is that it can be used to evaluate to what degree a system satisfies service requirements of an user's application. [1] and the references therein give a good overview on state-of-the-art theories and algorithms of scheduler and resources management, especially for OFDM based systems.

However, all of the prior arts have mathematically formulated the problem on the assumptions that a system is one Basestation and all the user terminals (UEs) being considered are associated with the Basestation under study. As a result, the cost function as well as its optimization targets how to maximize a cost function with respect to some or all users in one BTS subject to the capacity limit and other constraints such that certain performance measures are achieved. Hence, the scheduler and resource management algorithms derived from above assumption and theory are for scheduling UEs in individual BTS without considering other BTSs, their corresponding schedulers, and their UEs. Mathematically, the above optimization problem is to assign radio resources in order to maximize the following cost function:

$$\frac{1}{M}\sum_{i=1}^{M} U_i(r_i[n])$$

Where $r_i[n]$ is the instantaneous dates of user i at time n, $U_i(\bullet)$ is the corresponding utility function of user i. Again, all the users are in the same cell or being served by one BTS, and the optimization is done w.r.t. one cell or BTS.

On implementation side, traditionally, the scheduler resides in the BTS, or NodeB in 3GPP term. The scheduler is responsible for assigning radio resources to the UEs in the cell based on the available radio resources, user channel quality, user request, QoS requirements.

Additional radio resource management residing further above BTSs is responsible for handoff related resource management, such as orthogonal code assignment between the cells, application data buffer management, and so on.

SUMMARY OF THE INVENTION

The present embodiments provide methods for wireless communications, specifically, methodology and algorithm to management resources and schedule users in a coordinated way among a group of base stations, such as Femtocells, Picocells, self-organized Basestations, Access Points (APs) or mesh network nodes, or among the basestations in a two tiered networks, such as Femtocells within a Macrocell, to improve the performance for individual user, individual Basestation (BTS), the overall systems or all of above.

Certain embodiments as disclosed herein provide for mathematical formulation of the problem, methodology of deriving the solutions, and the corresponding algorithms to manage resources and schedule users among a group of base stations, such as Femtocells, Picocells or Access Points (AP), or among the basestations in a two tiered networks, such as Femtocells within a Macrocell, to improve the performance for individual user, individual Basestation (BTS), the overall systems or all of above.

According there is provided a first method of managing wireless resources comprising the steps of a) identifying a group of cells with at least two cells as neighboring cells, b) identifying a group of users from the group of the cells, c) providing a utility function for each user, d) providing a radio resource allocation objective based upon one cost function for the group of users from the group of cells identified in step a) and d) allocating a portion of a resource to each user in dependence upon a cost function for the group of users.

Accordingly there is provided a second method of managing wireless resources comprising the steps of a) identifying a group of cells, b) providing a utility function for each cell, c) providing a radio resource allocation objective based on one cost function for the group of cells identified in step a) and d) allocating a portion of radio resource to each cell such that the objective is met.

Accordingly there is provided a third method of managing wireless resources comprising the steps of a) identifying a group of cells. b) identifying a group of users from the group of cells, c) providing a utility function for a cell or a user or both in the selected group, d) providing a first radio resource allocation objective based on one cost function for the group of users from the group of cells identified in step b), e) providing a second radio resource allocation objective based on one cost function for the group of cells identified in step a), f) determining an overall objective is a summation of the first and second objectives, and g) allocating a portion of radio resource to each cell or each user such that the overall objective is met.

BRIEF DESCRIPTION OF THE DRAWINGS

FIG. 5 shows a flow chart of resource allocation and scheduling algorithm optimized for the case of a group of users in more than one cell using rate based utility function according to the present invention.

FIG. 6 shows a flow chart of resource allocation and scheduling algorithm optimized for the case of a group of cells using rate based utility function according to the present invention.

DETAILED DESCRIPTION

Figure 1:
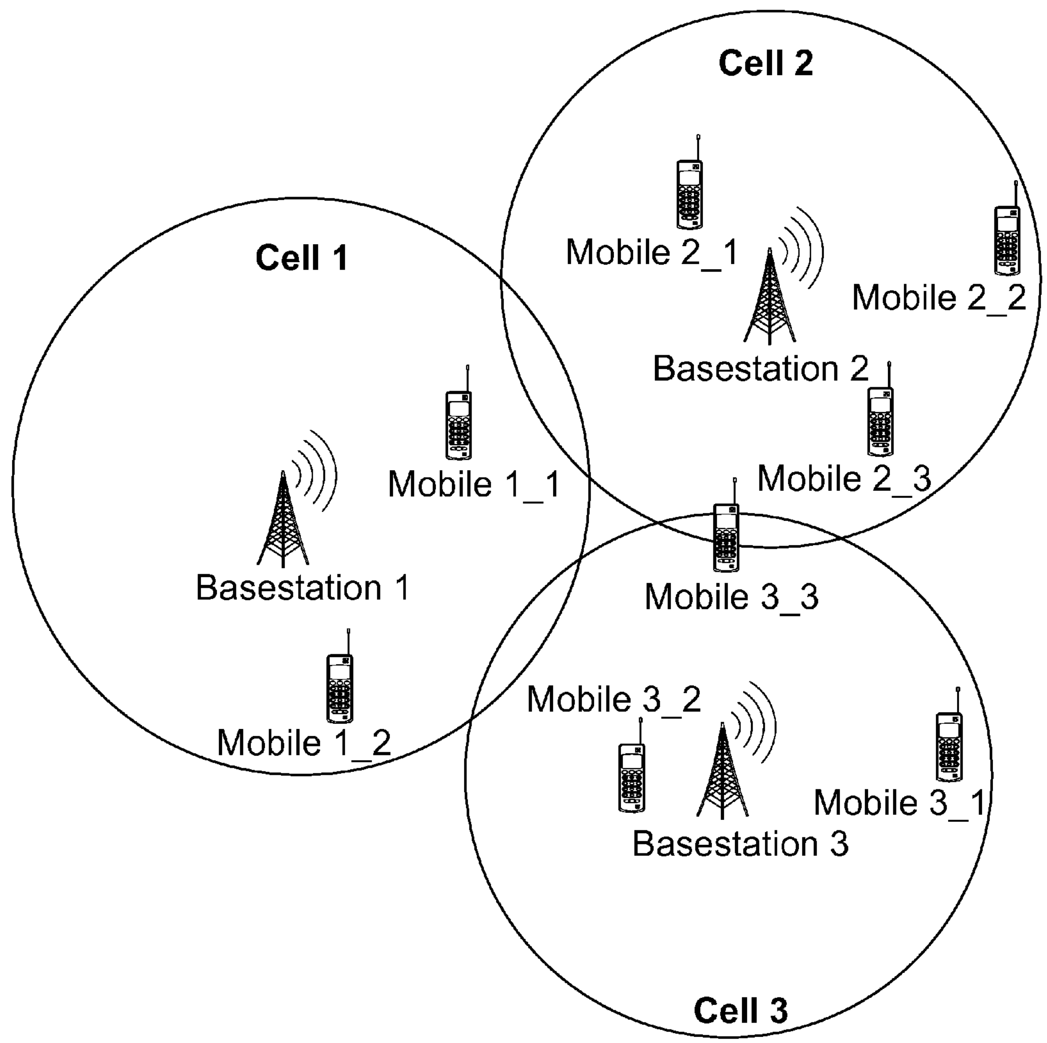
FIG. 1 illustrates radio resource optimization performed in each of the three individual cells with respect to the metrics of the terminals in each cells.

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention.

In a wireless system, a group of base stations (BTSs) can be managed by a centralized network management identity or can be self-organized by communicating with each other via wireless air-interfaces or wired interfaces. One such example is Femtocell system. In Femtocell system where Femtocell BTSs are connected to the core networks through wired or wireless broadband connections. The Femtocells are networked via either a wired backhaul or over-the-air. The provisioning of the Femtocell BTSs can be done either by the core network on a per device basis or in a coordinated fashion either under the complete supervision of the core networks, partial supervision of the core networks or without supervision at all.

The Femtocell incorporates the functionality of a typical base station but extends it to allow a simpler, self contained deployment; for example, a UMTS Femtocell containing a Node B, RNC and GSN with Ethernet for backhaul. Although much attention is focused on UMTS, the concept is applicable to all standards, including GSM, CDMA2000, TD-SCDMA and WiMAX solutions.

When the BTSs are using the same frequency for transmitting and receiving with relatively large transmitting power and when they are closer to each other, such as Femtocells, performance such as system and user throughput or QoS get degraded due to a number factors, such as the interference between the BTSs and among the users in the same BTS or in different BTSs, or in a two-tier networks where Femtocell BTSs are within a Macrocell BTS. One contributing factor is that the resource management and scheduler algorithms today are trying to maximize certain cost functions over some or all UEs in each individual BTS in order to achieve better performance such as user and system throughput.

When a Femtocell system has the capability to network and coordinate via either a wired backhaul or over-the-air, resource management and scheduling UEs can be done either by a coordinated fashion either under the complete supervision of the core networks (completely centralized), partial supervision of the core networks (partially centralized) or without supervision at all (distributed).

According to one embodiment of the present invention, a neighbor list will be formed based on the measurement from users in each BTSs or by each BTS itself in order to enable scheduling and resource management among the BTSs. When the measurements of its neighbor BTSs, such as reference signal strength across all frequency or in certain frequency group, the interference level across all frequency or in certain frequency group, distance in RF signal strength sense, are above pre-determined thresholds, the BTS(s) will be added to the neighbor list of the said BTS. Optionally, the relative position of the BTSs based the measurement, such as DOA, is known, the neighbor can also be described by their topology. The neighbor list changes dynamically based on the real-time measurements. The server on the network maintains the neighbor list for all the BTSs, and each BTS maintains a copy of its own neighbor list.

According to one embodiment of the present invention, a resource allocation and scheduling optimization method is proposed where the objective is to maximize cost function with respect to one or more cells or BTSs. Constraints other than cost function can be added in the optimization process.

When the utility function is date rate based, the above optimization problem is to allocation radio resources to maximize:

$$\sum_{i \in G} U_i(r_i)$$

where $U_i(\bullet)$ is the utility functions for an individual user, a group of users, a cell, or multiple cells, $r_i$ is instantaneous data rate or averaged data rate, depending on the definition of the utility function, of an individual user, a group of users, a cell, or multiple cells. G is a set that consists of 1. A group of users in one cell or BTS
2. A group of users in more than one cells or BTSs
3. A group of cells or BTSs each having one or more users
4. Combination of a group of users in one or more cells and one or a group of cells.

When G represents a group of users in one cell or BTS, i.e. the $1^{st}$ case above, it reduces to the model that all prior arts use. Referring to FIG. 1 there is illustrated radio resource optimization is performed in each of the three individual cells with respect to the metrics of the terminals in each cells. In this example, Cell 1 radio resource is optimized w.r.t. Mobile 1_1 and Mobile 1_2; Cell 2 radio resource is optimized w.r.t. Mobile 2_1, Mobile 2_2 and Mobile 2_3; Cell 3 radio resource is optimized w.r.t. Mobile 3_1, Mobile 3_2 and Mobile 3_3.

The $2^{nd}$ through $4^{th}$ cases are the new model this embodiment describes, and are used in deriving the following embodiments.

Figure 2:
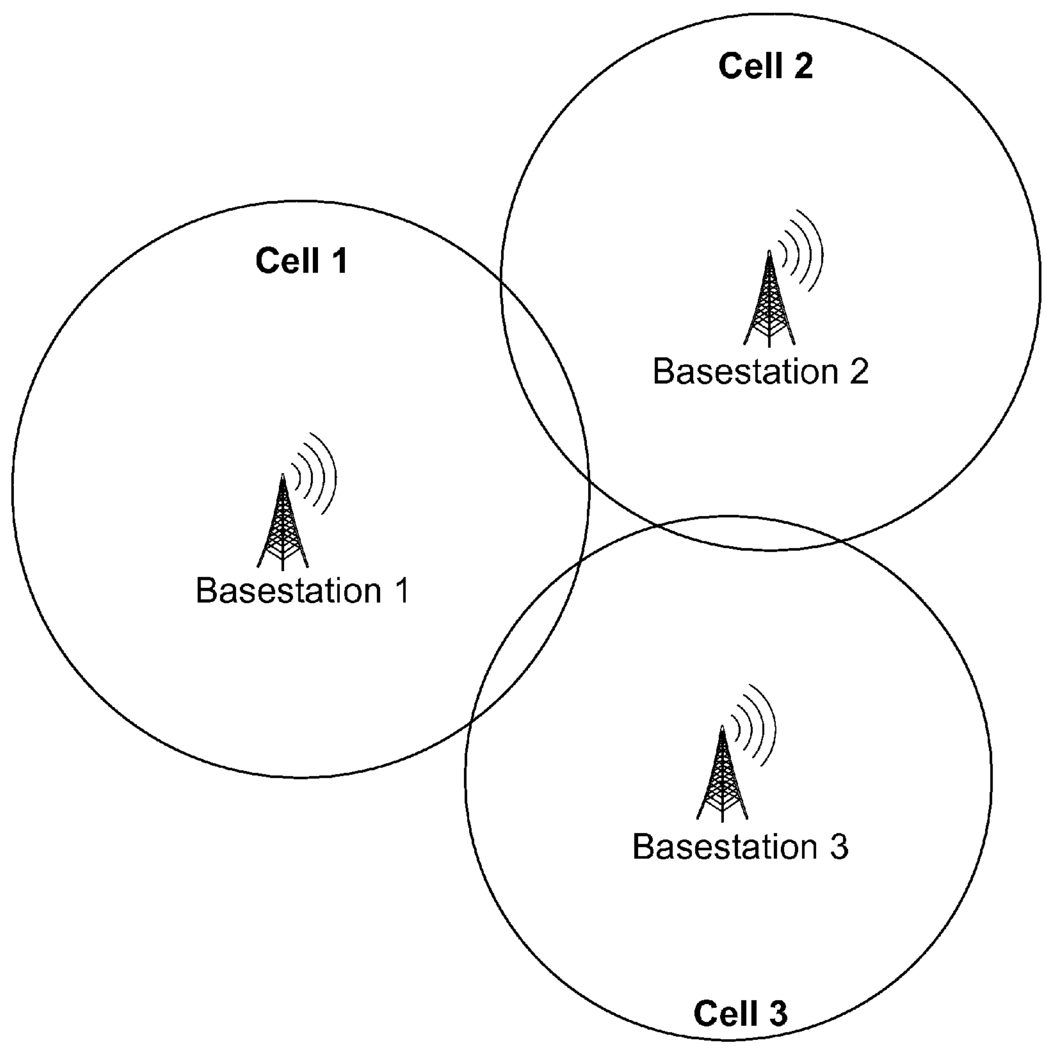
FIG. 2 illustrates an example of radio resource optimization is performed for all neighboring cells with respect to each individual cell level metrics.

Referring to FIG. 2 there is illustrated an example of radio resource optimization is performed for all neighboring cells with respect to each individual cell level metrics. In this example, overall radio resource is optimized w.r.t. Cell_1, Cell_2 and Cell_3.

Figure 3:
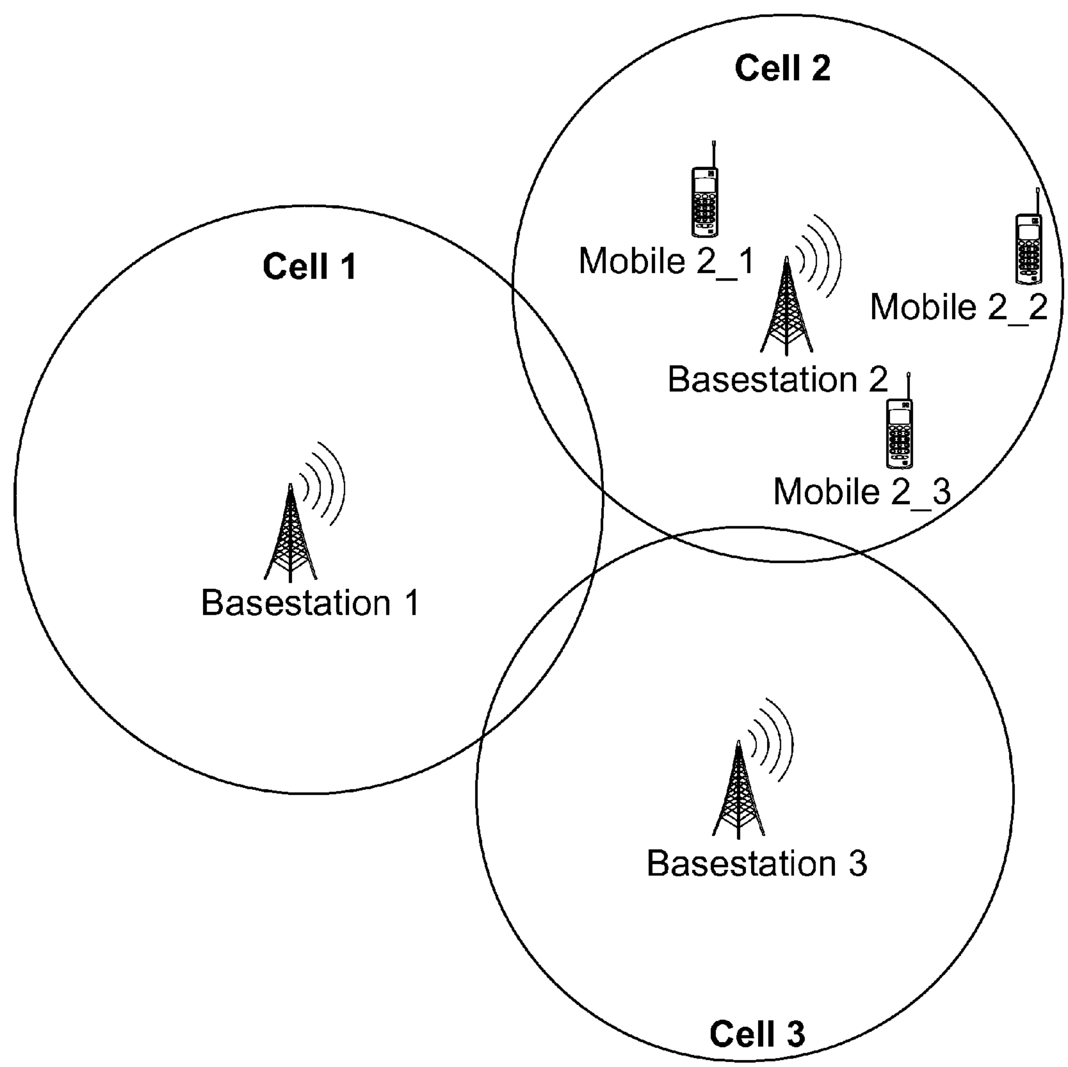
FIG. 3 illustrates an example of radio resource optimization is performed for all neighboring cells with respect to the combination of metrics of all terminals in some cells and each individual cell level metrics for other cells.

Referring to FIG. 3 there is illustrated an example of radio resource optimization is performed for all neighboring cells with respect to the combination of metrics of all terminals in some cells and each individual cell level metrics for other cells. In this example, overall radio resource is optimized w.r.t. Cell 1, Mobile 2_1, Mobile 2_2 and Mobile 2_3, and Cell 3.

Figure 4:
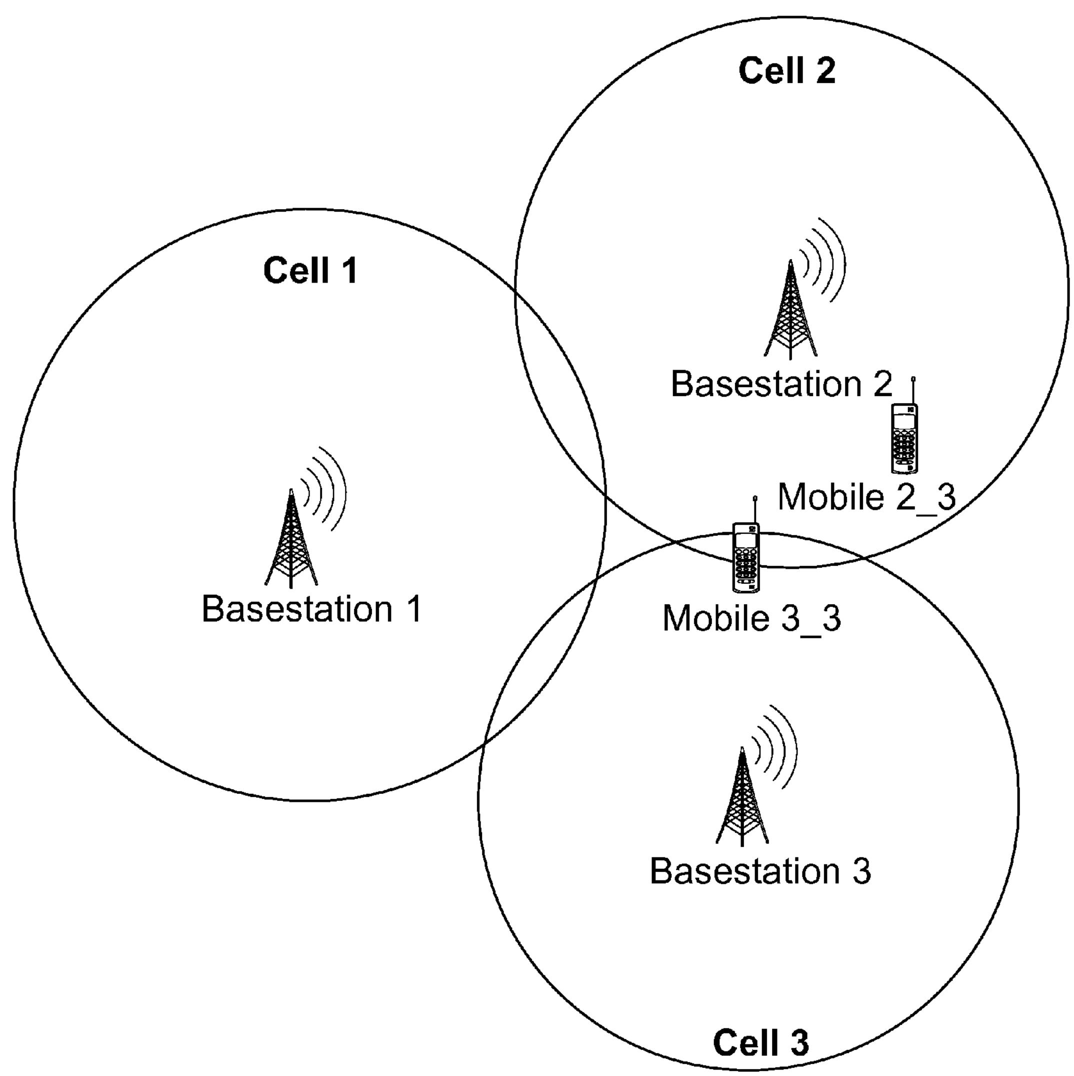
FIG. 4 illustrates an example of radio resource optimization is performed for all neighboring cells with respect to the combination of metrics of groups of terminals in some cells and each individual cell level metrics for other cells.

Referring to FIG. 4 there is illustrated an example of radio resource optimization is performed for all neighboring cells with respect to the combination of metrics of groups of terminals in some cells and each individual cell level metrics for other cells. In this example, overall radio resource is optimized w.r.t. Cell 1, Cell_2, Mobile 2_3, Cell 3, and Mobile 3_3.

It should be noted that even though data rate based utility function is used herein to illustrate the methodology; the embodiment can be applied to other types of utility functions. One such example if a delay-based utility function that is a function of an average waiting time of a user.

According to another embodiment of the present invention, the optimization problem is to allocation radio resources to maximize the cost function, which is a sum of the users' utility functions where a group of users may belong to more than one cells or BTSs and they can be assigned to different utility function. The users in each cell can entirely or partially be used in the optimization process depending on the criteria used in defining the relationship between the users. Other constraints than cost function can be added in the optimization process.

Assume the optimization is done for the users across N cells with each having $M_j$ users. With rate based utility function, the optimization problem is to allocation radio resources to maximize $$\frac{1}{N}\sum_{j=1}^{N}\left(\frac{1}{M}\sum_{i=1}^{M_j}U_{ij}(r_{ij}[n])\right).$$

Where $r_{ij}[n]$ is the instantaneous data rate of user i in cell j at time n, $U_{ij}(\bullet)$ is the corresponding utility function of user i, $M_j$ is number of users used in the optimization in cell j, and N is number of neighboring cells used in the optimization. Note that $M_j$ can represent total number of users or portion of the total users, depending on the optimization criteria or system requirements.

Using an OFDM system and subcarrier assignment as an example, the achievable data rate for user i at subcarrier frequency k for a given downlink transmission power density $p_j[k,n]$ and signal-to-interference-and-noise ratio (SINR) $q_{ij}[k,n]$ is $$c_{ij}(k,n)=f(\ln(1+gp_j[k,n]q_{ij}[k,n]))\text{ bits/sec/Hz}$$

where g is SINR gap. To simplify the derivation, assume continuous rate adaptation is used, we have $$c_{ij}(k,n)=\ln(1+gp_j[k,n]q_{ij}[k,n])\text{ bits/sec/Hz}$$

when user i is assigned to subcarrier group $K_i$ with subcarrier spacing of Δf, the data rate for user i is $$r_{ij}[K_i,n]=\sum_{k\in K_i}c_{ij}[k,n]\Delta f.$$

Let $r_{ij}[K_i,n]$ be the data rate for user i at time n and $\bar{r}_{ij}[K_i,n]$ be the average data rate for user i at time n, w is the ratio of the slot length to the average window. $r_{ij}[K_i,n]$ can be represented by $$\bar{r}_{ij}[K_i,n]=(1-w)\bar{r}_{ij}[K_i,n-1]+wr_{ij}[K_i,n].$$

Define $x_{ijnK_i}$ as $$x_{ijnK_i}=\begin{cases}1, & \text{if subcarrier group } K_i \text{ is asssigned to user } i \text{ in cell } j\\ 0, & \text{otherwise,}\end{cases}$$

the optimization problem as be formulated as $$\max_x \frac{1}{N}\sum_{j=1}^{N}\left(\frac{1}{M}\sum_{i=1}^{M_j}U_{ij}\left(\Delta f\sum_{k\in K_i}c_{ij}[k,n]x_{ijnK_i}\right)\right),$$

$$\text{subject to }\sum_{j=1}^{N}\left(\sum_{i=1}^{M_j}x_{ijnK_i}\right)=1,\ x_{ijnK_i}\in\{0,1\}$$

Hence the gradient scheduling algorithm is $$\{i,j\}_{[K_i,n]}=\underset{(i,j)}{\operatorname{argmax}}\{wU'_{ij}(\bar{r}_{ij}[K_i n])c_{ij}[k,n]\}$$

where user i can belong to any of the N cells.

Clearly, when the average window length equals to the slot length, $\bar{r}_{ij}[K_i,n]=r_{ij}[K_i,n]$, one could drop the variable n in all of the above equations and the gradient scheduling algorithm becomes $$\{i,j\}_{[K_i]}=\underset{(i,j)}{\operatorname{argmax}}\{U'_{ij}(r_{ij}[K_i])c_{ij}[k]\}$$

where user i can belong to any of the N cells.

Even though we refer k as subcarrier frequency, Δf as subcarrier spacing, and K as subcarrier frequency group, one can replace subcarrier frequency by subcarrier frequency group, subcarrier spacing by total spacing of subcarrier group, and subcarrier frequency group by subcarrier frequency group set. The above derivation is then applied to any grouping methods of subcarrier frequency of an OFDM system. The same argument is also applied to all of the following embodiments.

An example of algorithm flow chart for the above embodiment is illustrated in FIG. 5.

According to one embodiment of the present invention, the optimization problem is to allocation radio resources to maximize the cell level utility function, which is a sum of each cell or BTSs' utility functions. Each cell or BTSs can be assigned to different utility function.

Assume the optimization is done across N cell with one utility function assigned to each cell. With rate based utility function, the optimization problem is to allocation radio resources to maximize $$\frac{1}{N}\sum_{j=1}^{N}U_j(r_j[n]).$$

Where $r_j[n]$ is the total or average instantaneous data rate of $M_j$ users in cell j at time n, $U_j(\bullet)$ is the utility function of cell j, and N is number of neighboring cells used in the optimization. The definition of $U_j(\bullet)$ depends on how $r_j[n]$ is defined. A straightforward way to define $r_j[n]$ is as the data rate of all the users, or part of the users in cell j, $$\text{i.e. } r_j[n]=\sum_{i=1}^{M_j}r_i[n].$$

When $M_j$ is less than the total users in the cell, it represents only a group of the users.

There are other ways to define $r_j[n]$. For example, it can be defined as average instantaneous data rate of $M_j$ users in cell j at time n, $$r_j[n] = \frac{1}{M_j}\sum_{i=1}^{M_j} r_i[n].$$

When $M_j$ is less than the total users in the cell, it represents only a group of the users. Or it can be defined as maximum instantaneous data rate among $M_j$ users in cell j at time n, $$r_j[n] = \max_{i\in M} r_i[n].$$

Using OFDM system and subcarrier assignment as an example and assume continuous rate adaptation, the achievable data rate for user i at subcarrier frequency k for a given downlink transmission power density p[k,n] and signal-to-interference-and-noise ratio (SINR) $q_i[k,n]$ is $$c_i(k,n)=\ln(1+gp[k,n]q_i[k,n]) \text{ bits/sec/Hz}$$

When cell j is assigned to subcarrier group $K_i$ with subcarrier spacing of $\Delta f$, the data rate for user or user in cell j that are actually assigned to the resources is $$r_j[K_j, n] = \sum_i r_i[K_i, n] = \sum_i \sum_{k\in K} c_j[k, n]\Delta f$$

Let $r_j[K_j,n]$ be the data rate for cell j at time n and $\bar{r}_j[K_j,n]$ be the average data rate for cell j at time n, w is the ratio of the slot length to the average window. $\bar{r}_j[K_j,n]$ can be represented by $$\bar{r}_j[K_j,n]=(1-w)\bar{r}_j[K_j,n-1]+wr_j[K_j,n].$$

Define $x_{jnK_j}$ as $$x_{jnK_j} = \begin{cases} 1, & \text{if subcarrier group } K_j, \text{ is asssigned to cell } j \\ 0, & \text{otherwise,} \end{cases}$$

the optimization problem as be formulated as $$\max_x \frac{1}{N}\sum_{j=1}^{N}\left(U_j\left(\Delta f \sum_{k\in K_i} c_j[k, n]x_{jnK_{i,}}\right)\right),$$

$$\text{subject to } \sum_{j=1}^{N}(x_{jnK_{i,}}) = 1,\ x_{jnK_{i,}} \in \{0, 1\}$$

Hence the gradient scheduling algorithm is $$\{i, j\}_{[K_{i,},n]} = \underset{j,i\in M_j}{\operatorname{argmax}}\{wU_j'(\bar{r}_j[K_j,n])c_j[k, n]\}$$

Even thought the optimization is done with respect to the cells, the resource assignment and scheduling can be done on each user or a group of users in individual cell level. In other words, for each set of available resource, the user in each cell that maximizes the cell level utility functions is assigned.

Since $$r_j[K_j, n] = \sum_i r_i[K_{i,}, n],$$

the resource assigned to j can then be directly assigned to user or users that are used to calculate the data rate.

Clearly, when the average window length equals to the slot length, $\bar{r}_j[K_i,n]=r_j[K_i,n]$, so we could drop the variable n in all of the above equations and the gradient scheduling algorithm becomes $$\{i, j\}_{[K_{i,}]} = \underset{j,i\in M_j}{\operatorname{argmax}}\{U_j'(r_j[K_i])c_j[k]\}$$

An example of algorithm flow chart for the first case of the above embodiment is illustrated in FIG. 6.

A more complicated way is to have another level of optimization for resource and scheduling in each individual cell and the results of the resource assignments from each cell is used to select user groups in order to calculate $$r_j[n] = \sum_i r_i[n].$$

Applying $r_j[K_j,n]$ to the above process, one can obtain $\{j\}_{[K_i,n]}$, the resource assigned to j can then be assigned to user or users based on the priority order from the scheduler in each individual cell. In case there are conflict in the assignment in the two scheduler, one or more iteration of the above process can be perform till either certain criteria are met or a pre-determined number of iterations is reached.

According to another embodiment of the present invention, the optimization problem is to allocation radio resources to maximize the cell level utility function, which is a sum of cell or BTSs' utility functions. The utility function can be individual cell based or a group of cell based. Each cell or BTS or a group of cells can be assigned to different utility function.

According to one embodiment of the present invention, the optimization problem is to allocation radio resources to maximize the cost function, which is a sum of combination of individual users' utility functions in some cells and cell level utility function for other cells.

Assume the optimization is done for the users across $N_1$ cells with each having $M_j$ users and across $N_2$ cell with one utility function assigned to each cell. With rate based utility function, the optimization problem is to allocation radio resources to maximize $$\frac{1}{N_1}\sum_{j=1}^{N_1}\left(\frac{1}{M}\sum_{i=1}^{M_j} U_{ij}(r_{ij}[n])\right) + \frac{1}{N_2}\sum_{j=1}^{N_2} U_j(r_j[n]).$$

Using an OFDM system and subcarrier assignment as an example, and with the same derivation as before, we define $X_{ijnK_i}$, as $$x_{ijnK_i,} = \begin{cases} 1, & \text{if subcarrier group } K_{i,} \text{ is asssigned to user } i \text{ in cell } j \\ 0, & \text{otherwise,} \end{cases}$$

define $x_{jnK_i}$, as $$x_{jnK_i,} = \begin{cases} 1, & \text{if subcarrier group } K_{i,} \text{ is asssigned to cell } j \\ 0, & \text{otherwise,} \end{cases}$$

the optimization problem as be formulated as $$\max_x \left( \frac{1}{N_1} \sum_{j=1}^{N_1} \left( \frac{1}{M} \sum_{i=1}^{M_j} U_{ij} \left( \Delta f \sum_{k \in K_i} c_{ij}[k, n] x_{ijnK_{i,}} \right) \right) + \frac{1}{N_2} \sum_{j=1}^{N_2} \left( U_j \left( \Delta f \sum_{k \in K_i} c_j[k, n] x_{jnK_{i,}} \right) \right) \right),$$

$$\text{subject to } \sum_{j=1}^{N_1} \left( \sum_{i=1}^{M_j} x_{ijnK_{i,}} \right) + \sum_{j=1}^{N_2} x_{jnK_{i,}} = 1,$$

$$x_{ijnK_{i,}} \in \{0, 1\}, x_{jnK_{i,}} \in \{0, 1\}$$

Hence the gradient scheduling algorithm is $$\{i, j\}_{[K_i, n]} = \underset{(i,j)}{\operatorname{argmax}} \{w U'_{ij}(\bar{r}_{ij}[K_i, n]) c_{ij}[k, n]\}$$

Clearly, when the average window length equals to the slot length, $\bar{r}_{ij}[K_i,n]=r_{ij}[K_i,n]$, one could drop the variable n in all of the above equations and the gradient scheduling algorithm becomes $$\{i, j\}_{[K_i]} = \underset{(i,j)}{\operatorname{argmax}} \{U'_{ij}(r_{ij}[K_i]) c_{ij}[k]\}$$

According to one embodiment of the present invention, as special case of the above case with $N_1=1$ and $N_2>=1$, a macrocell BTS has multiple users and one or more Femtocell BTSs. The resource management and scheduling can be done among the macrocell BTS with respect to the utility functions of the individual users and the utility functions of one or more Femtocell BTSs.

According to one embodiment of the present invention, different antenna weighting in a multiply antenna systems based on beamforming or pre-coding can be used as part of the resource allocation and scheduling optimization.

Using an OFDM system as an example, the antenna weighting enters the optimization process via the power density downlink transmission power density $p_j[k,n]$ in the calculation of $$c_{ij}(k,n)=f(\ln(1+gp_j[k,n]q_{ij}[k,n])) \text{ bits/sec/Hz}$$

The optimization process based on the first embodiment can be derived for power allocation using the similar method as in [1] and the references therein.

According to another embodiment of the present invention, a resource allocation and scheduling optimization uses the objective which involves two levels of optimization. The first level is to maximize cost function with respect to users in individual cell or BTS, i.e. to allocation radio resources to maximize $$\frac{1}{M} \sum_{i=1}^{M_j} U_i(r_i[n]).$$

The second level is to maximize cost function with respect to users in multiple cells or BTSs, i.e. to allocation radio resources to maximize $$\frac{1}{N} \sum_{j=1}^{N} \left( \frac{1}{M} \sum_{i=1}^{M_j} U_{ij}(r_{ij}[n]) \right).$$

After that, the 1$^{st}$ level resource allocation and scheduling will take the outcome, including overall assigned resources and individual resource assignment, from 2$^{nd}$ level scheduler as input and re-allocate and re-schedule the UEs in each cell and BTs. This process is iterated till either certain criteria is met or a pre-determined number of iterations is reached.

According to another embodiment of the present invention, a resource allocation and scheduling optimization uses the objective which involves two levels of optimization. The first level is to maximize cost function with respect to users in individual cell or BTS, i.e. to allocation radio resources to maximize $$\frac{1}{M} \sum_{i=1}^{M_j} U_i(r_i[n]).$$

The second level is to maximize cell level cost function with respect to multiple cells or BTSs, i.e. to allocation radio resources to maximize $$\frac{1}{N} \sum_{i=1}^{N} U_j(r_j[n]).$$

After that, the 1$^{st}$ level resource allocation and scheduling will take the outcome from 2$^{nd}$ level scheduler as input and re-allocate and re-schedule the UEs in each cell and BTs. This process is iterated till either certain criteria is met or a pre-determined number of iterations is reached again.

According to another embodiment of the present invention, the two level resource allocation and scheduling can be done using different time granularity with cell level resource allocation using longer time interval while individual user level scheduling using shorter time interval. More specifically, at each time interval $T_2$, radio resources is done by coordinated scheduler to maximize cell level cost function $$\frac{1}{N} \sum_{i=1}^{N} U_j(r_j[n]).$$

After the allocation of the resources to all the cells, the individual cell uses the assigned resource to schedule users by maximizing individual user based cost function $$\frac{1}{M}\sum_{i=1}^{M_j} U_i(r_i[n])$$

at each time interval of $T_1$, where $T_1 << T_2$ or $T_1 < T_2$. The scheduling is repeated until reaching the $T_2$ interval, where the cell level resource assignment is performed.

As special case of the above case, a macrocell BTS has multiple users and one or more Femtocell BTSs. The resource allocation at time interval $T_2$ will be done among the macrocell BTS and Femtocell BTS or BTSs with respect to the utility functions of the cells. After that, at each time interval $T_1$ macrocell and each Femtocells schedules individual user and with respect to users' utility functions.

According to one embodiment of the present invention, the users in a cell can be grouped into user group that is being interfered by other cells or interfering other cells (we call it interfered user group); and user group that is not (non-interfered user group). The criteria that is used to define the group can be based on interference level for the entire frequency band or in certain code channels in CDMA case or frequency tones in OFDM case. It can also be based on certain quality indicators such as bit error rate, packet error rate, and so on. It can also be based on channel quality indicators. The above method can be applied to a group of Femtocells or Picocells or between one Macrocell and one or more Femtocell and Picocell.

According to another embodiment of the present invention, the 1st level in a resource allocation and scheduling is to maximize cost function with respect to individual users in each individual cell or BTS, i.e. to allocation radio resources to maximize $$\frac{1}{M}\sum_{i\in M_j} U_i(r_i[n]),$$

where $M_j$ represents the users in each individual cell. The 2nd level in a resource allocation and scheduling is to maximize cost function in the cell level based on the users in the interfered user group, and the scheduling is done with respective to multiple cells or BTSs, i.e. to allocation radio resources to maximize $$\frac{1}{N}\sum_{j=1}^{N} U_j(r_j[n])$$

where $U_j(r_j[n])$ is the cell level cost function with respect to the interfered user group in each of the N cells. After that, the 1st level resource allocation and scheduling will take the outcome from 2nd level scheduler as input and re-allocate and re-schedule either all the users in a cell or only the interfered users in each cell and BT. This process is iterated till either certain criteria is met or a pre-determined number of iterations is reached.

According to one embodiment of the present invention, the total radio resources are divided into multiple levels with some are served strictly for each cell's private use, some for common use so they can be allocated by the coordinated scheduler. It is possible to have another portion of resources that can be used in either of the above two cases in an ad hoc basis.

According to another embodiment of the present invention, the allocation of the private and common resources can also be adaptive over time, and it should have longer time adaptation rate compared to the user scheduler. The allocation of the common and private resources across cells can use similar principle outlined in the previous embodiment, i.e. the allocation of the private and common resources is done by coordinated resource management to maximize cell level cost function $$\frac{1}{N}\sum_{j=1}^{N} U_j(r_j[n]).$$

After the allocation of the resources to all the cells, the individual cell can use the assigned resource to schedule users based on the following embodiments.

According to another embodiment of the present invention, the 1st level in a resource allocation and scheduling is to allocate private resources to non-interfered users by maximizing cost function with respect to individual user in each individual cell or BTS, i.e. to allocation radio resources to maximize $$\frac{1}{M_G}\sum_{i\in(M_j-G_j)} U_i(r_i[n]),$$

where $M_j$ represents all the users in each individual cell and $G_j$ represents interfered users. The 2nd level in a resource allocation and scheduling is to allocate common resources to interfered users by maximizing cost function in the cell level based on the users in the interfered user group. The scheduling can be done with respective to multiple cells or BTSs, i.e. to allocation radio resources to maximize $$\frac{1}{N}\sum_{j=1}^{N} U_j(r_j[n])$$

where $U_j(r_j[n])$ is the cell level cost function with respect to the interfered user group in each of the N cells; or the scheduling can be done with respective to interfered users in multiple cells or BTSs, i.e. to allocation radio resources to maximize $$\frac{1}{N}\sum_{j=1}^{N}\left(\frac{1}{M_G}\sum_{i\in G_j} U_{ij}(r_{ij}[n])\right).$$

According to another embodiment of the present invention, the 1st level in a resource allocation and scheduling is to maximize cost function with respect to all of the users in each individual cell or BTS by using the private resources. The 2nd level in a resource allocation and scheduling is to maximize cost function with respect to those users who have not been assigned private resources or have not been assigned private resources sufficiently. This is done with respect to multiple cells or BTSs by using common resources. This process can also be iterated till either certain criteria is met or a pre-determined number of iterations is reached.

According to another embodiment of the present invention, the $1^{st}$ level in a resource allocation and scheduling is to maximize cost function with respect to the users across multiply cells by using the common resources. The $2^{nd}$ level in a resource allocation and scheduling is to maximize cost function with respect to those users who have not been assigned common resources or have not been assigned common resources sufficiently. This is done in each individual cell or BTS by using private resources. This process can also be iterated till either certain criteria is met or a pre-determined number of iterations is reached.

According to another embodiment of the present invention, the $1^{st}$ level in a resource allocation and scheduling is to maximize cell level cost function with respect to multiple cells or BTSs by using the common resources. The $2^{nd}$ level in a resource allocation and scheduling is to maximize cost function with respect to all the users in each individual cell or BTS by using common sources being assigned to each cell or BTS as well as its own private resources. This process can also be iterated till either certain criteria is met or a pre-determined number of iterations is reached.

According to another embodiment of the present invention, the BTSs that perform the resources allocations and scheduling can be in different tiers. One example is that one BTS is macrocell BTSs and another BTS is Femtocell BTS. Two of them can coordinate the resource assignment and scheduling based on all of the previous embodiments.

Even though data rate based utility function is used in the above derivation and examples, other utility function can be used and the approach can be applied.

According to another embodiment of the present invention, the coordination between the BTSs can be in a completely centralized way, partially distributed way, or completely distributed way.

According to another embodiment of the present invention, when the coordination is completely centralized, the BTSs send the measurements and information required for resource allocations to the network via in-band signaling or out-of-band signaling or a combination of both. The network uses this information to perform resource allocation and scheduling. This corresponding allocation and coordination information are sent back to each BTSs.

According to another embodiment of the present invention, when the coordination is partially centralized, the BTSs send the measurements and information required for resource allocations to the network via in-band signaling or out-of-band signaling or a combination of both. The network uses this information to perform resource allocation and scheduling. This corresponding allocation and coordination information are sent back to each BTSs. The scheduler in each BTS uses the information sent back by the centralized network resource manager as input to its scheduler in a way that they would have the same priority as other resources and UEs. Different scheduling and resource management algorithms can be applied here.

According to another embodiment of the present invention, when the coordination is completely distributed, the BTSs send the measurements and information required for resource allocations to its neighbor BTSs determined by its neighbor list via in-band signaling or out-of-band signaling or a combination of both. The information sent to specific neighbor only includes those related to that BTS.

According to one embodiment of the present invention, the receiving neighbor BTSs will accept the request, deny the request or send back a modified version of the request based on predetermined algorithms. One example of the modified version of the request can be granting with less resources than requested or granting the resources but with a shorter time period or a time delay.

According to another embodiment of the present invention, the neighbor BTS that received the information and requests from other neighbor BTSs shall use the information either as a constraint to its scheduler or as part of the overall input to its scheduler. Depending on outcome from the scheduling results, the 2nd BTS decides whether to accept, deny or propose a new resource allocation. The 1st and the 2nd BTSs shall use the following procedure depending on whether the request from the 1st BTS is accepted, denied or modified.

When the request is denied, the 1st BTS can either renegotiate e.g. send a modified request with less resource requirements, or accept the results as it and run the scheduling and resource allocation algorithm without any constraints. The 2nd BTS will do the same.

When the request is granted, the 1st BTS treats the granted resources together from other neighbor BTSs as an input to its scheduler while the 2nd BTS should take into account of the resource already granted to the 1st BTS as a constraint to its scheduler.

When the request is neither accepted nor denied by a neighbor BTS, the 2nd BTS will send back a proposed resource grant plan that is based on the available resources determined by its scheduler or resource management entity to the 1st BTS. The 1st BTS can either decide to accept the new proposal or to re-negotiate, i.e. send a modified request with less resource requirements. In the case that the 1st BTS accepts the new proposal, the 1st BTS will acknowledge to the 2nd BTS. The 1st BTS then treats the granted resources together from other neighbor BTSs as an input to its scheduler while the 2nd BTS should take into account of the resource already granted to the 1st BTS as a constraint to its scheduler.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a text messaging system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A method of optimizing multiple cells in a wireless network comprising the steps of:

a) identifying a group of cells with at least two cells as neighboring cells;

b) identifying a group of users from the group of the cells;

b) providing a utility function for each user, where $U_{ij}(\bullet)$ is the corresponding utility function of user i in cell j;

c) providing a radio resource allocation objective based upon one cost function for the group of users from the group of cells identified in step a); and d) allocating a portion of a resource to each user in dependence upon a cost function for the group of users;

wherein the cost function is given by $$\frac{1}{N}\sum_{j=1}^{N}\left(\frac{1}{M}\sum_{i=1}^{M_j}U_{ij}(r_{ij}[n])\right)$$

where $r_{ij}[n]$ is the instantaneous data rate of user i in cell j at time n, $U_{ij}(\bullet)$ is the corresponding utility function of user i in cell j, $M_j$ is number of users used in the optimization in cell j, and N is number of neighboring cells used in the optimization.

2. A method as claimed in claim 1 wherein that $M_j$ represents a total number of users in cell j.

3. A method as claimed in claim 1 wherein that $M_j$ represents a portion of total users in cell j.

4. A method of optimizing multiple cells in wireless network comprising the steps of:

a) identifying a group of cells;

b) providing a utility function for each cell, where $U_j(\bullet)$ is the utility function of cell j;

c) providing a radio resource allocation objective based on one cost function for the group of cells identified in step a);

d) allocating a portion of radio resource to each cell such that the objective is met;

wherein a group of cells has the same utility function while others have different utility functions; wherein the cost function used in optimization is given by $$\frac{1}{N}\sum_{j=1}^{N}U_j(r_j[n])$$

where $r_j[n]$ is a data rate of $M_j$ users in cell j at time n, $U_j(\bullet)$ is the utility function of cell j, and N is number of neighboring cells in the optimization, where $M_j$ is number of users used in the optimization cell j.

5. A method as claimed in claim 4 wherein $r_j[n]$ is a total data rate of $M_j$ users.

6. A method as claimed in claim 4 wherein $r_j[n]$ is an average instantaneous data rate of $M_j$ users.

7. A method of managing wireless resources comprising the steps of:

a) identifying a group of cells;

b) identifying a group of users from the group of cells;

c) providing a utility function for a cell, where the utility function is on of $U_j(\bullet)$ which is the utility function of cell j, and $U_{ij}(\bullet)$, which is the corresponding utility function of user i in cell j or both in the selected group;

d) providing a first radio resource allocation objective based on one cost function for the group of users from the group of cells identified in step b);

e) providing a second radio resource allocation objective based on one cost function for the group of cells identified in step a);

f) determining an overall objective is a summation of the first and second objectives; and g) allocating a portion of radio resource to each cell or each user such that the overall objective is met.

8. A method as claimed in claim 7 wherein each cell has a different utility function.

9. A method as claimed in claim 7 wherein users in a first group of cells are assigned a first utility function and users in a second group of cells are assigned a second utility function.

10. A method as claimed in claim 9 wherein allocating resources is to maximize $$\frac{1}{N_1}\sum_{j=1}^{N_1}\left(\frac{1}{M}\sum_{i=1}^{M_j}U_{ij}(r_{ij}[n])\right)+\frac{1}{N_2}\sum_{j=1}^{N_2}U_j(r_j[n])$$

where $r_{ij}[n]$ is the instantaneous data rate of user i in cell j at time n, $U_{ij}(\bullet)$ is the corresponding utility function of user i in cell j, $M_j$ is number of users used in the optimization in cell j, and N is number of neighboring cells used in the optimization and where $r_j[n]$ is a data rate of $M_j$ users in cell j at time n, $U_j(\bullet)$ is the utility function of cell j, and N is number of neighboring cells.

11. A method as claimed in claim 7 wherein the step of allocating includes the step of using coordination among the cells.

12. A method as claimed in claim 11 wherein coordination among cells is centralized.

13. A method as claimed in claim 11 wherein coordination among cells is partially distributed.

14. A method as claimed in claim 11 wherein coordination among cells is completely distributed.

15. A method as claimed in claim 7 wherein users in a cell having the different utility functions.

16. A method as claimed in claim 7 wherein the step of allocating radio resources is realized by using coordination among the cells.

* * * * *